W. Yost
Improvement in Plow
No. 121,567.  Patented Dec. 5, 1871.
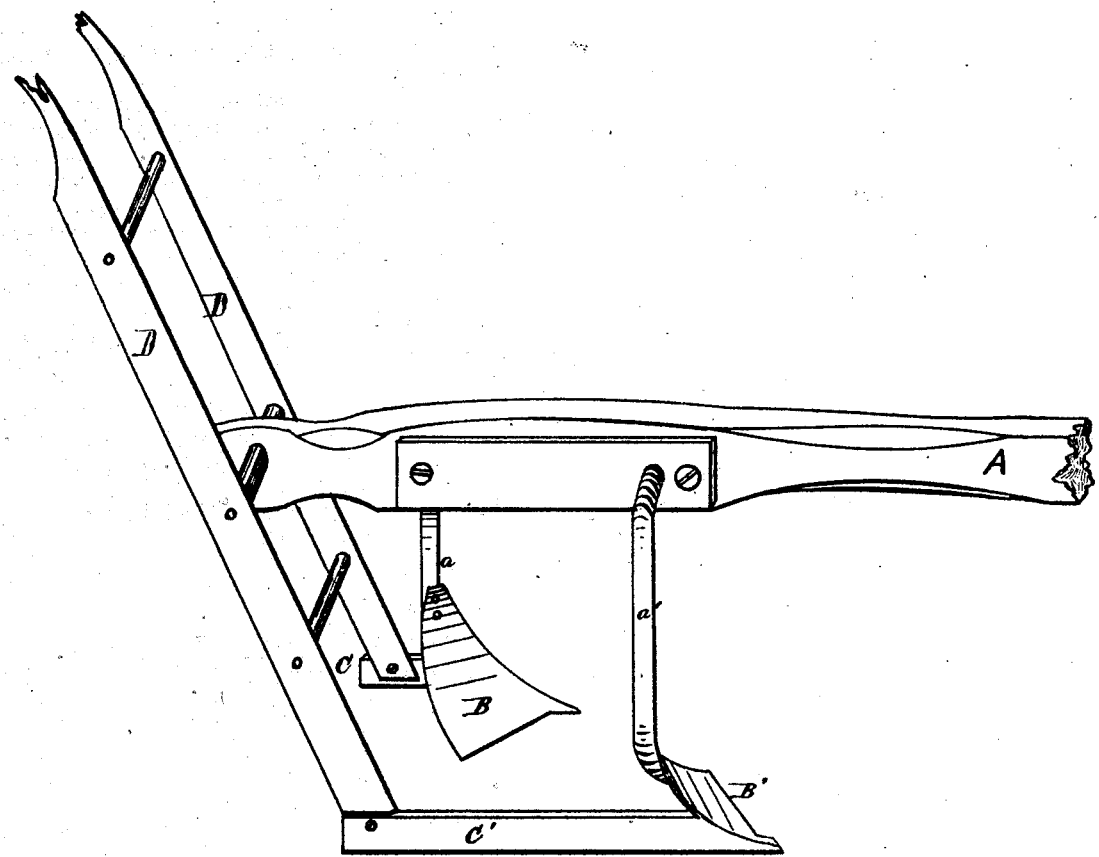
Witnesses:
W. C. Raymond
Emma Greenaway
Inventor
W. Yost by
H. W. Beadle atty

UNITED STATES PATENT OFFICE.

WILLIAM YOST, OF GOSHEN, OHIO.

IMPROVEMENT IN PLOWS.

Specification forming part of Letters Patent No. 121,567, dated December 5, 1871; antedated November 25, 1871.

*To all whom it may concern:*

Be it known that I, WILLIAM YOST, of Goshen, in the county of Clermont and State of Ohio, have invented a new and useful Improvement in Plows; and I do hereby declare that the following is a full and exact description of the same, reference being had to the accompanying drawing and to the letters of reference marked thereon.

This invention relates to plows; and consists in certain details of construction, which will be fully described hereinafter.

In the drawing a perspective view of my improved plow is shown.

To enable others skilled in the art to make and use my invention, I will now proceed to describe fully its construction and manner of operation.

A represents the plow-beam, to which are attached in any suitable manner the curving standards $a\ a'$, one being located forward of the other, as shown. B B' represent the shares attached to the lower ends of standards $a\ a'$, and arranged to throw the dirt in toward the center. C C' represent the share-bars, which, extending rearwardly, are attached to the lower ends of the handles D D, which latter are also secured to the rear end of the plow-beam A by means of a cross-bar, as shown.

The operation is as follows: The plow is drawn between the rows in the usual manner. The plows cut the earth straight down upon both sides of the furrows, and the dirt is left finely pulverized in the furrow. The young plants are protected from injury from the action of the rear share by the rearwardly-extending bar of the front share, and by the furrow which has been opened by the front share.

Having thus fully described my invention, what I claim as new, and desire to secure by Letters Patent, is—

The plow described, consisting of the bar A, curving standards $a\ a'$, shares B B', share-bars C C', and handles D D', the parts being relatively arranged, as described.

This specification signed and witnessed this 19th day of April, A. D. 1871.

WM. YOST.

Witnesses:
THORNTON MCKENNER,
G. W. ROGERS.

(114)